United States Patent
Ng (10) Patent No.: US 9,263,210 B2
(45) Date of Patent: Feb. 16, 2016

(54) TWO-SHOT INJECTION MOLDED HOUSING WITH SEATS FOR KEYCAPS IN USER-INTERFACE

(71) Applicant: HOME CONTROL SINGAPORE PTE. LTD., Toa Payoh (SG)

(72) Inventor: Kian Ho Ng, Singapore (SG)

(73) Assignee: Home Control Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/406,658

(22) PCT Filed: Jun. 14, 2013

(86) PCT No.: PCT/IB2013/054881
§ 371 (c)(1),
(2) Date: Dec. 9, 2014

(87) PCT Pub. No.: WO2013/190439
PCT Pub. Date: Dec. 27, 2013

(65) Prior Publication Data
US 2015/0129407 A1 May 14, 2015

Related U.S. Application Data

(60) Provisional application No. 61/662,488, filed on Jun. 21, 2012.

(51) Int. Cl.
*B41J 5/00* (2006.01)
*H01H 13/88* (2006.01)
(Continued)

(52) U.S. Cl.
CPC ............ *H01H 13/86* (2013.01); *G06F 3/0202* (2013.01); *H01H 13/704* (2013.01); *H01H 13/88* (2013.01);
(Continued)

(58) Field of Classification Search
CPC .................. B41J 5/00; B41J 5/12; B41J 5/14; B41J 5/16; H01H 13/86; H01H 9/0235; H01H 2229/034; H01H 2229/046; H01H 13/88; H01H 2215/004; H01H 13/704; H01H 2221/058; H01H 2223/044; G06F 3/0202
USPC .............. 400/472–496; 341/22, 176; 345/169
See application file for complete search history.

(56) References Cited

U.S. PATENT DOCUMENTS 4,532,575 A * 7/1985 Suwa ........................ 361/679.09
4,764,770 A * 8/1988 Church .......................... 200/5 A
(Continued)

FOREIGN PATENT DOCUMENTS

CN 104395861 A 3/2015
EP 2864855 A2 4/2015
(Continued)

OTHER PUBLICATIONS
International Search Report for Int'l Application No. PCT/IB2013/054881, "Two-Shot Injection Molded Housing With Seats for Keycaps in User-Interface," date mailed Feb. 20, 2014.
(Continued)

*Primary Examiner* — Nguyen Ha
(74) *Attorney, Agent, or Firm* — Hamilton, Brook, Smith & Reynolds, P.C.

(57) ABSTRACT

A device has a housing with a top part that accommodates one or more pressable keys forming the user-interface of the device. Each specific key has a specific keycap. The top part is formed from a harder plastic element and a softer rubber layer in a two-shot injection molding process. The harder plastic element has one or more openings occupied by the softer rubber layer. The harder plastic element has a specific pin positioned in a specific hole of the softer rubber layer. The specific keycap has a bottom face with a specific protruding sleeve configured for engaging with the specific pin. The bottom face of the specific key and an area at a top face of the softer rubber layer have complimentarily shaped profiles configured for accurately orienting the keycap relative to the top part.

2 Claims, 7 Drawing Sheets

(51) Int. Cl.
*H01H 13/86* (2006.01)
*G06F 3/02* (2006.01)
*H01H 13/704* (2006.01)
*H01H 9/02* (2006.01)

(52) U.S. Cl.
CPC ........ *H01H 9/0235* (2013.01); *H01H 2215/004* (2013.01); *H01H 2221/058* (2013.01); *H01H 2223/044* (2013.01); *H01H 2229/034* (2013.01); *H01H 2229/046* (2013.01)

(56) References Cited

U.S. PATENT DOCUMENTS

| | | | |
|---|---|---|---|
| 5,940,015 | A | 8/1999 | Thornton et al. |
| 6,166,662 | A * | 12/2000 | Chuang ............................. 341/22 |
| 6,770,824 | B1 * | 8/2004 | Faucher ........................ 200/5 A |
| 8,242,396 | B2 * | 8/2012 | Chen ...................... H01H 13/83 200/310 |
| 2002/0011689 | A1 * | 1/2002 | Chi et al. ....................... 264/219 |
| 2005/0024240 | A1 | 2/2005 | Fyke et al. |
| 2007/0000766 | A1 * | 1/2007 | Yang et al. .................... 200/341 |
| 2007/0199814 | A1 * | 8/2007 | Kobayashi et al. ........... 200/520 |
| 2007/0221490 | A1 * | 9/2007 | Huang ................... H01H 13/88 200/520 |
| 2008/0012747 | A1 | 1/2008 | Bredow et al. |
| 2008/0018606 | A1 | 1/2008 | Chen |
| 2008/0034577 | A1 * | 2/2008 | Yeh ................... B29C 45/14778 29/622 |
| 2008/0252492 | A1 * | 10/2008 | Shi ................................. 341/22 |
| 2009/0236206 | A1 * | 9/2009 | Wennemer et al. ........ 200/302.2 |
| 2010/0213043 | A1 * | 8/2010 | Chen et al. ..................... 200/5 A |
| 2011/0073454 | A1 * | 3/2011 | Chen et al. ..................... 200/5 A |
| 2012/0227251 | A1 * | 9/2012 | Hyuga ................... H01H 13/88 29/622 |
| 2013/0015048 | A1 * | 1/2013 | Senzaki ........................ 200/513 |
| 2014/0262715 | A1 * | 9/2014 | Lee et al. ....................... 200/5 A |

FOREIGN PATENT DOCUMENTS

| | | |
|---|---|---|
| JP | S61-183035 U | 11/1986 |
| JP | H02-24428 U | 2/1990 |
| JP | H02-92522 U | 7/1990 |
| JP | H06-26125 U | 4/1994 |
| JP | H10-177829 A | 6/1998 |
| JP | 2006-107986 A | 4/2006 |
| JP | 2009-110891 A | 5/2009 |
| WO | 2009109875 A1 | 9/2009 |
| WO | 2012004749 A1 | 1/2012 |
| WO | WO 2013/190439 A2 | 12/2013 |
| WO | WO 2013/190439 A3 | 12/2013 |

OTHER PUBLICATIONS

Written Opinion of the Int'l Searching Authority for Int'l Application No. PCT/IB2013/054881, "Two-Shot Injection Molded Housing With Seats for Keycaps in User-Interface," date mailed Dec. 21, 2014.

International Preliminary Report on Patentability for Int'l Application No. PCT/IB2013/054881, "Two-Shot Injection Molded Housing With Seats for Keycaps in User-Interface," date issued Dec. 23, 2014.

\* cited by examiner

TWO-SHOT INJECTION MOLDED HOUSING WITH SEATS FOR KEYCAPS IN USER-INTERFACE

CROSS-REFERENCE TO PRIOR APPLICATIONS

This application is the U.S. National Phase application under 35 U.S.C. §371 of International Application No. PCT/IB2013/054881, filed on Jun. 14, 2013, which claims the benefit of U.S. Provisional Application No. 61/662,488, filed on Jun. 21, 2012. This application is hereby incorporated by reference herein.

FIELD OF THE INVENTION

The invention relates to a device comprising a user-interface configured for manual interaction of a user with the device, wherein the device has a housing accommodating the user-interface, the user-interface comprises one or more keys, and each specific one of the keys has a specific keycap. The invention further relates to a housing for use in such device and to a top part for use in such as device.

BACKGROUND ART

Devices of the kind specified in the preamble are well known in the art. Examples of such devices are: handheld electronic devices such as remote control devices, video game controllers and mobile telephones, keyboards for text entry or playing music, switches at the dashboard or at the doors of an automobile, etc.

If real estate is scarce for accommodating the keycaps, or if the spatial distribution of the keycaps needs to comply with aesthetic requirements, an accurate positioning of the keycaps is required so as to make full use of the room available or so as to give a precise, regular character to the spatial arrangement of the keycaps. This is especially relevant to a so-called "piano key arrangement".

The expression "piano key arrangement" indicates a lay-out of the keycaps, wherein the keycaps form a visually regular one-dimensional array or a visually regular two-dimensional array, wherein the keycaps themselves are flat and wherein neighboring ones of the keycaps are separated by a relatively very narrow gap. The lay-out of the piano keycaps requires accurate sizing and accurate mounting of the keycaps, as any difference in the orientation or in the height between a pair of neighboring ones of the keycaps is easily noticed by the user. This difference may then hamper the pleasing aesthetics of the piano-key lay-out or may interfere with the operation of the user-interface.

SUMMARY OF THE INVENTION

It is an object of the invention to provide a device with a user-interface that is especially attractive for such piano key arrangements.

More specifically, the invention relates to a device comprising a user-interface configured for manual interaction of a user with the device. The device has a housing accommodating the user-interface. The user-interface comprises one or more keys. Each specific one of the keys has a specific keycap. The housing comprises a top part of a harder plastic element and a softer rubber layer, e.g., silicone. The harder plastic element has one or more openings occupied by the softer rubber layer. The top part is made in a two-shot injection molding process. The softer rubber layer has a specific hole. The harder plastic element has a specific pin positioned in the specific hole. The specific keycap has a bottom face with a specific protruding sleeve configured for engaging with the specific pin, e.g., through a snap-fit. The bottom face of the specific key and an area at a top face of the softer rubber layer have complimentarily shaped profiles configured for accurately orienting the keycap relative to the top part.

The device of the invention has a design which combines the harder plastic element and the softer rubber layer to form a neatly arranged basis for a piano key arrangement. The softer rubber layer serves as the seats for the keycaps. A two-shot injection molding process is used for physically integrating the softer rubber layer with the harder plastic element, thus forming the top part. The dimensions of the pin follows pre-specified dimensions in the tooling and will not be affected during long usage. Standard productions methods can be used for manufacturing the plastic keycaps and the assembly of the keycaps to their seats. The assembly only needs to insert the keycaps onto the designated pins that are accessible through the holes in the softer rubber layer. The softer rubber layer acts as a cushion and clamps the keycaps to prevent dislocation and accidental removal. The design is compact and will contribute to an attractive outlook with smoother lines.

Advantages of the design of the device in the invention are manifold and also affect robustness of the device. For example, the overall cost of the device is reduced with respect to conventional designs owing to less material being wasted and fewer materials being involved. Tooling is less expensive. Assembly costs are reduced owing to needing fewer jigs and fixtures during assembly. The gap between adjacent keycaps is better controllable. The difference in height between adjacent keys and between the keycaps and the surrounding housing are better controllable. The device is better equipped for withstanding liquid being spilled over the keycaps, as there are no openings left through which the liquid can trickle into the innards of the device via the user-interface.

In an embodiment of the device, the harder plastic element has multiple openings. Adjacent ones of the openings are separated by one or more ribs that form a physically integrated part of the harder plastic element. The one or more ribs are covered by the softer rubber layer.

By having the softer rubber layer covering the rib, the force required to actuate the key is controlled not only by the elasticity of the softer rubber layer, but also by the elasticity of the rib when the rib is undergoing a transverse deformation. The width and/or height of the rib can then be adjusted in order to provide the desired behavior with regard to the force required.

The invention also relates to a housing and to a top part for use in the device specified above, as the invention can also be commercially exploited by providing such housings or such top parts.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

Figure 1:
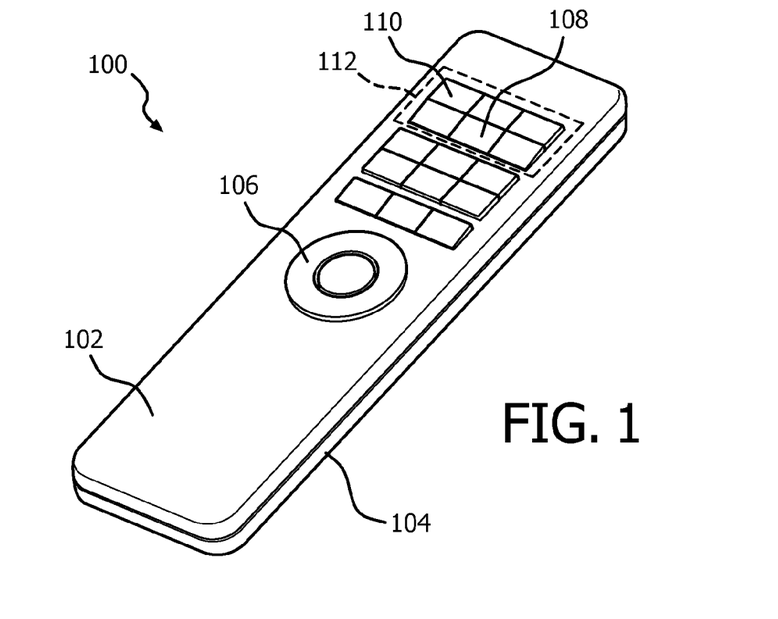
FIG. 1 is a diagram of a device in the invention.

FIG. 1 is a diagram of a device 100 according to the invention. The device 100 illustrated in FIG. 1 is a handheld device, in this case a remote control device for control of, e.g., consumer electronics (CE) equipment (not shown).

The device 100 comprises a housing with a top part 102 and a bottom part 104. The top part 102 accommodates a user-interface of the device 100. The user-interface has a keymat for a plurality of keys that the user can press in operational use of the device 102. The term "keymat" refers to a visible part of the set of pressable keys in the user-interface, i.e., the set of keycaps. The keymat includes, e.g., a first keycap 106 of a directional key for control of a cursor or highlight rendered on a display monitor (not shown), a second keycap 108 of a specific menu option key for selecting a specific control option, a third keycap 110 of another specific menu option key for selecting another specific control option, . . . , etc.

The lay-out of the keymat and the individual shape, color, size profile, etc., of an individual one of the keycaps are design choices. In the example shown in FIG. 1, the second keycap 108 and the third keycap 110 form parts of a set 112 of keycaps, referred to as "piano key arrangement", as discussed earlier.

In a typical user-interface that comprises keys that can be pressed by the user, the pressing of a particular key closes an electrical, normally open, switch that then connects a pair of nodes of an electronic circuit. If the switch is open, a non-zero DC-voltage is present between the pair of nodes. If the switch is closed, an electrical current flows from one of the nodes to the other one of the nodes, thus changing the state of the electronic circuit. The electronic circuit is configured for carrying out a pre-determined action upon being subjected to this change of state. For example, the pressing of a specific menu option key of a remote control device causes the remote control device to transmit a specific infrared signal, or a specific radio-frequency signal, which, upon being received by a controllable apparatus causes the apparatus to assume a corresponding state (e.g., sound volume of an mp3 player higher or lower) or to carry out a corresponding action (e.g., render a configuration menu on the display monitor of a TV receiver). Upon releasing the pressed key, the key returns to the position the key had before the key was being pressed. The returning of the key is implemented through intervention of a key-supporting element that is being deformed elastically when the key is being pressed, and that returns to its equilibrium state when the key is being released again.

In the following, reference will be made to the diagrams of FIGS. 2-9 combined, as different features of the device 100 are better visible in different ones of the diagrams. Each individual one of the features discussed below is indicated by an individual reference numeral in the diagrams. The first digit of a specific feature corresponds to the number of the Figure wherein the specific feature is introduced first.

An aspect of the device 100 in the invention relates to the manufacturing of the top part 102 and to the implications thereof in the assembly of the device 100 from its constituents.

The top part 102 is made in a two-shot injection molding process. Two-shot injection molding processes are known in the art. A two-shot injection molding process is based on a difference in the melting points of two different thermoplastic resins that are used to make an article from these different resins, in this case, the top part 102.

Figure 2:
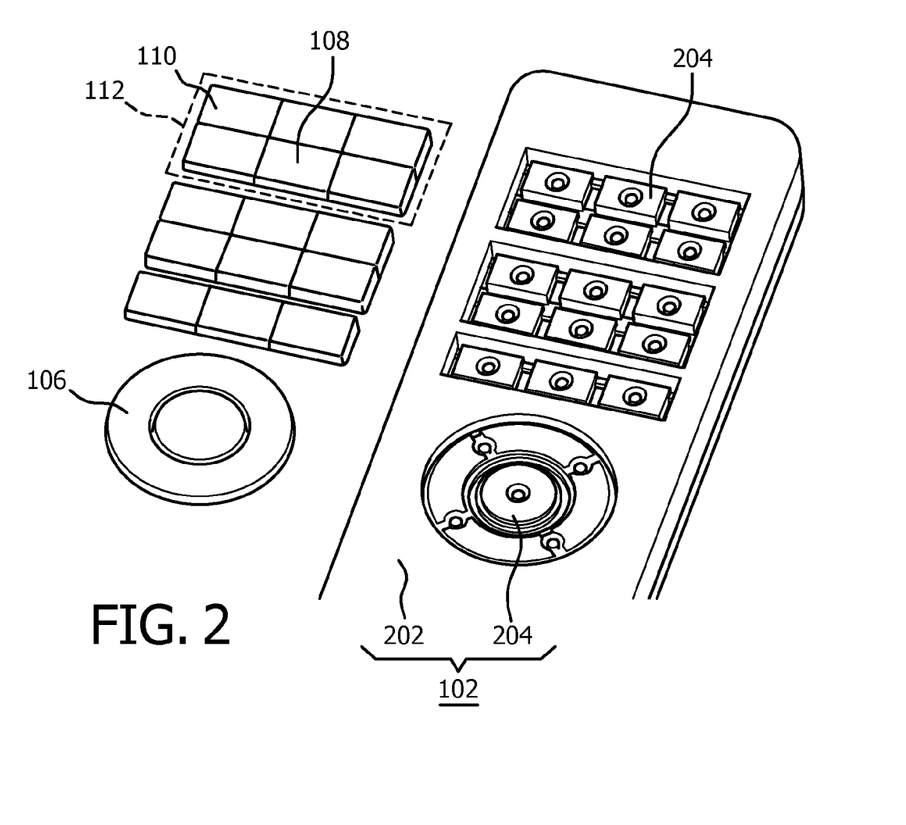
FIG. 2 is a diagram of the top part of the housing separated from the keycaps.

FIG. 2 is a diagram illustrating the top part 102, now separated from the keycaps, e.g., separated from the first keycap 106 of the directional key, and separated from the remaining keys, among which is the keymat 112 comprising the second keycap 108 and the third keycap 110. The top part 102 is made in a two-shot injection molding process. Two-shot injection molding processes are known in the art. A two-shot injection molding process is based on a difference in the melting points of two different thermoplastic resins that are used to make an article from these different resins, in this case top part 102. The top part 102 comprises a harder plastic element 202, and one or more softer, rubber elements, made together in a two-shot injection molding process. The one or more rubber elements are collectively referred to in this text as the softer rubber layer and is indicated in the Figures with a reference numeral 204. The diagram of FIG. 2 illustrates the softer rubber layer 204 with an upper face that is profiled so as match an inverse profile of the bottom face of each of the keycaps. The softer rubber layer 204 firmly holds the keycaps, and the keycaps are attached to an upper face of the softer rubber layer 204 by elastically deforming the softer rubber layer 204.

Figure 3:
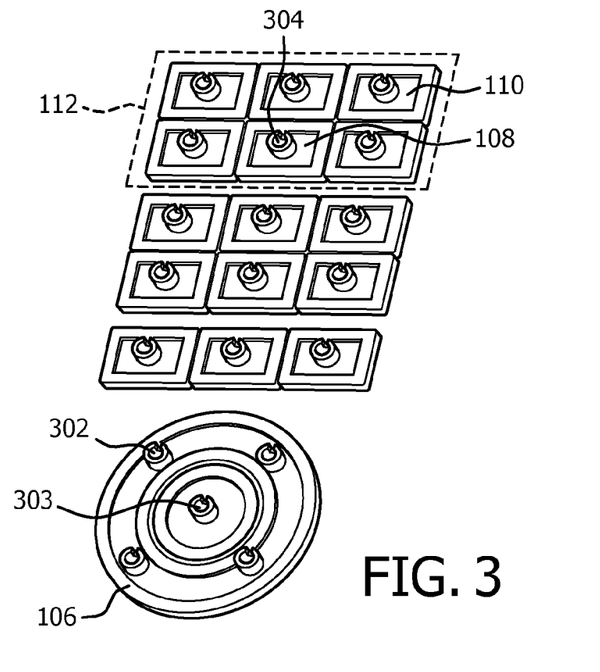
FIG. 3 is a diagram illustrating the bottom faces of the keycaps.

FIG. 3 is a diagram illustrating the bottom faces of the keycaps whose profiles are the inverse of the profiles at the upper layer of the softer rubber layer 204. Each of the keycaps illustrated in the diagram of FIG. 3 has a lower face with one or more protruding slotted sleeves. For example, the lower face of the first keycap 106 for the directional key has five protruding slotted sleeves, of which a first one is indicated with a reference numeral 302 and a second one is indicated with a reference numeral 303, in order to not obscure the drawing. The lower face of the second keycap 108 has a third protruding slotted sleeve 304. Each specific one of the protruded slotted sleeves fits into a corresponding hole in the softer rubber layer 204 as illustrated in the diagram of FIG. 4.

Figure 4:
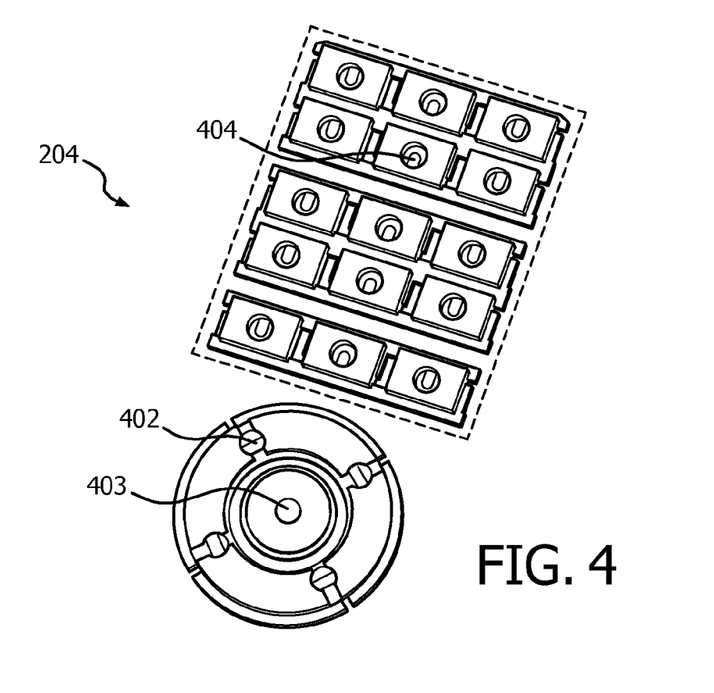
FIG. 4 is a diagram showing the profiles at the upper faces of the softer rubber layer of the top part.

FIG. 4 is a diagram showing the profiles at the upper faces of the components making up the softer rubber layer 204. The first protruding slotted sleeve 302 is configured for being positioned into a first hole 402 in the component of the softer rubber layer 204 that is configured for accommodating the first keycap 106 for the directional key. The second protruding slotted sleeve 303 is configured for being positioned into a second hole 403 in the component of the softer rubber layer 204 that is configured for accommodating the first keycap 106 for the directional key. The third protruding slotted sleeve 304 is configured for being positioned into a third hole 404 in the component of the softer rubber layer 204 that is configured for accommodating the second keycap 108.

The upper face of the softer rubber layer 204 and the lower face of the keycaps have complementarily corresponding profiles so as to help aligning the keycaps. For example, the lower face of the first keycap 106 has a donut-shapes recess located coaxially with the second protruding slotted sleeve 303, and the part of the softer rubber layer 204 has a donut-shaped elevation located coaxially with the second hole 403. The donut-shaped recess and the donut-shaped elevation fit together so as to accurately position the first keycap 106 relative to the top part 102 of the housing of the device 100. Similarly, the lower face of the second keycap 108 has a rectangular recess and the softer rubber layer 204 has a rectangular elevation that accurately engages with the rectangular recess of the second keycap 108. As the softer rubber layer 204 is formed together with the harder plastic element 202 in a two-shot injection molding process, the spatial accuracy of the two-shot injection molding process determines eventually the accuracy of the positions of the keycaps relative to one another. Accordingly, the formation of the softer rubber layer 204 together with the harder plastic element 202 in a two-shot injection molding process is highly suitable for a keymat with a piano key arrangement, as the gap between neighboring keycaps is well controllable.

Figure 5:
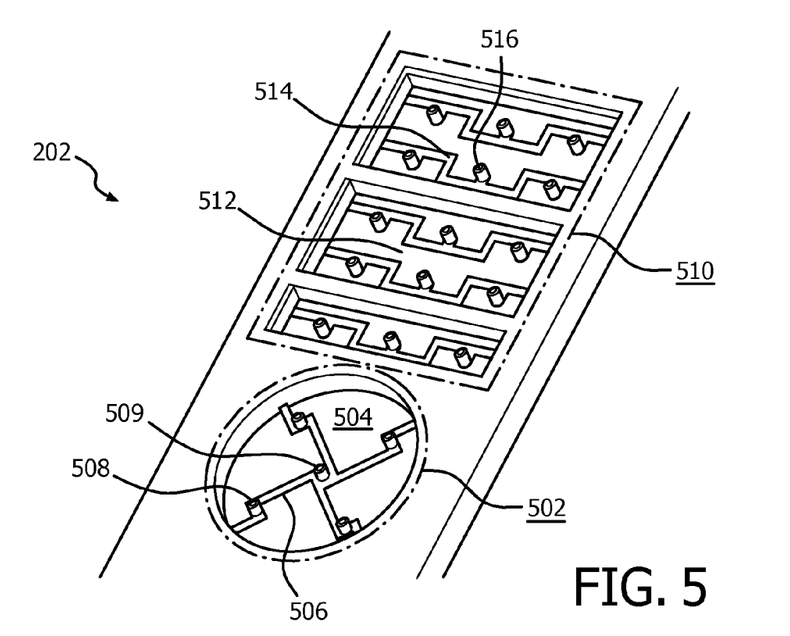
FIG. 5 is a diagram of the upper face of the harder plastic element of the top part.

FIG. 5 is a diagram of the upper face of the harder plastic element 202 of the top part 102, now separated from the softer rubber layer 204. Compare the diagram of FIG. 5 to the diagram of FIG. 2, wherein the harder plastic element 202 and the softer rubber layer 204 are shown as molded together in a two-shot injection molding process in order to form the top part 102, and wherein the upper face of the top part 102 is illustrated. The harder plastic element 202 is shaped with recesses and holes to accommodate the softer rubber layer 204.

The harder plastic element 202 has an area 502 that is shaped to accommodate the part of the softer rubber layer 204 that is going to receive the first keycap 106 for the directional key. The area 502 has multiple through-holes separated by multiple ribs. In order to not obscure the drawing, only a single through-hole is indicated with a reference numeral, here a reference numeral 504, and only a first rib is indicated with a reference numeral, here a reference numeral 506. The first rib 506 accommodates a first pin 508 and shares a second pin 509 with another rib. The first pin 508 engages with the first protruding slotted sleeve 302 of the first keycap 106 when the first protruding slotted sleeve 302 is stuck through the first hole 402 in the softer rubber layer 204. The first pin 508 engages with the first protruding slotted sleeve 302, for example, by means of a snap-fit joint. As known, a snap-fit joint is relies on the ability of a part to be deformed, here the first protruding slotted sleeve 302, within limits, and returned to its original shape when assembly of the first protruding slotted sleeve 302 and the first pin 508 is complete. The second pin 509 engages with the second protruding slotted sleeve 303, for example, by means of a snap-fit joint, when the second protruding slotted sleeve 303 is stuck through the second hole 403 in the softer rubber layer 204.

Likewise, the harder plastic element 202 has another area 510 that is shaped to accommodate the part of the softer rubber layer 204 that is going to receive the second keycap 108, the third keycap 110, etc. The other area 510 has multiple through-holes separated by multiple ribs. In order to not obscure the drawing, only a single through-hole is indicated with a reference numeral, here a reference numeral 512, and only a single one of the multiple ribs, here a second rib, is indicated with a reference numeral, here a reference numeral 514. The second rib 514 accommodates a third pin 516. The third pin 516 engages with the third protruding slotted sleeve 304 of the second keycap 108 when the third protruding slotted sleeve 304 is stuck through the third hole 404 in the softer rubber layer 204. The third pin 516 engages with the third protruding slotted sleeve 304, for example, by means of a snap-fit joint.

As mentioned earlier, the harder plastic element 202 and the softer rubber layer 204 are formed together in a two-shot injection molding process. The softer rubber layer 204 is elastic, i.e., the softer rubber layer deforms under a mechanical load and returns to its initial shape when the mechanical load is removed. Similarly, the ribs, such as the first rib 506 and the second rib 514, form an integral part of the harder plastic element 202. The ribs have some elasticity in a direction substantially perpendicular to the upper face of the top part 102, i.e., in the direction substantially transverse to a direction wherein the rib extends.

When a specific keycap is being pressed with a certain force in a direction substantially perpendicular to the upper face of the top part 102, and the device 100 as a whole is kept stationary (i.e., another force is being applied to the device 100 in the anti-parallel direction so as to prevent the device 100 from undergoing an acceleration), the specific keycap in turn presses against the part of the softer rubber layer 204 that accommodates the specific keycap. The specific keycap also presses against the relevant one of the ribs that carries a relevant one of the pins that engages with the protruding slotted sleeve of the specific keycap. The relevant one of the ribs, as well as the part of the softer rubber layer 204 accommodating the specific keycap, will deform in a downwards direction relative to the upper face of the top part 102. This downwards oriented deformation can then be used to control the state of a switch in order to change the state of electronic circuitry connected to this switch and accommodated within the housing of the device 100. This will be discussed in detail further below. Owing to the elasticity of the softer rubber layer 204 and of the elasticity of the relevant rib in the transverse direction, the specific keycap will return to its initial position when the force has disappeared.

Figure 6:
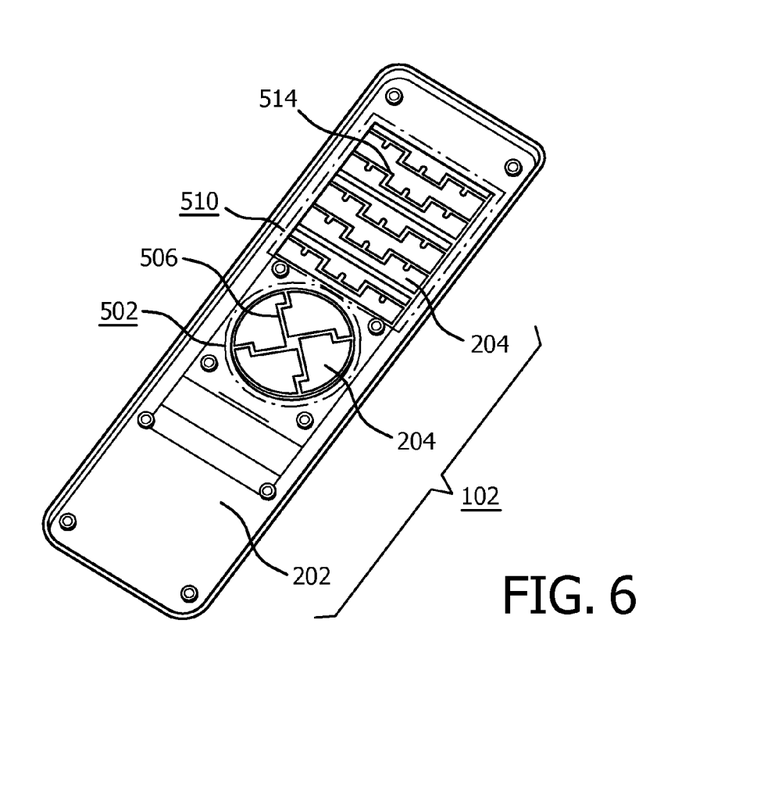
FIG. 6 is a diagram of a lower face of the top part.

FIG. 6 is a diagram of a lower face of the top part 102, showing the harder plastic element 202 physically integrated with the softer rubber layer 204.

FIGS. 7, 8, 9 and 10 are diagrams of lateral cross-sections of the device 100 in the invention.

Figure 7:
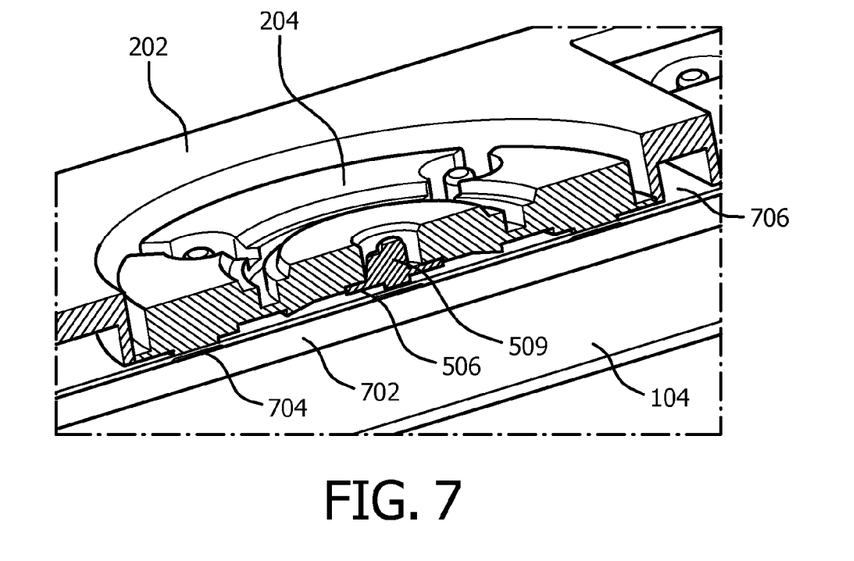
FIGS. 7, 8, 9 and 10 are diagrams of lateral cross-sections of the device in the invention.
Figure 8:
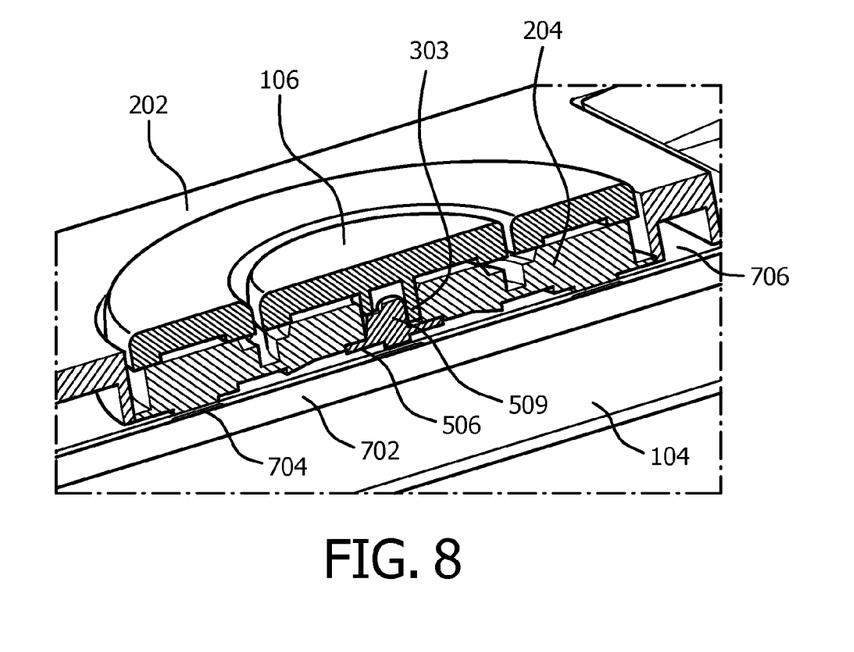

FIGS. 7 and 8 are diagrams showing a lateral cross-section of the device 100 at the area 502 that is shaped to accommodate the part of the softer rubber layer 204 that is going to receive the first keycap 106 for the directional key. The housing of the device 100 comprises the top part 102 and the bottom part 104, the top part 102 comprising the harder plastic element 202 and the softer rubber layer 204 molded together in a two-shot injection molding process. The housing accommodates a printed-circuit board (PCB) 702 with electronic circuitry (not shown) and one or more nodes (not shown). An electrically conductive layer 704 is provided between the PCB 702 and the bottom face of the softer rubber layer 204 (see the diagram of FIG. 6). The electrically conductive layer 704 is positioned over the nodes and at some distance from the nodes. Between the electrically conductive layer 704 and the nodes, there is a non-zero voltage. A specific node is electrically connected with the electrically conductive layer 704 when the directional key of the user-interface is being pressed at a specific location corresponding with the location of the specific node. The specific node is electrically disconnected from the electrically conductive layer 704 when the directional key is not being pressed at the specific location. An electrically conductive layer 704 is provided between the PCB 702 and the bottom face of the softer rubber layer 204 (see the diagram of FIG. 6). The electrically conductive layer 704 is positioned over the nodes and at some distance from the nodes. At the location of a specific node, the electrically conductive layer 704 has a specific dome locally decreasing the distance between the electrically conductive layer 704 and the PCB 702. When the directional key is being pressed at the specific location, the softer rubber layer 204 elastically deforms and the deformation causes the dome to establish an electrical contact between the specific node, as a result of which an electrical current flows. This in turn changes the state of the electronic circuitry in a pre-determined manner. For example, the electronic circuitry comprises a transmitter (e.g., an infrared (IR) transmitter or a radio-frequency (RF) transmitter). In response to the pressing of the directional key at the specific location, the transmitter is caused to transmit a specific IR command or a specific RF command in order to control moving a highlight or a cursor rendered on a display monitor (not shown).

Accordingly, the electrically conductive layer 704 and a specific node at the PCB 702 form a switch that is actuated when the corresponding key in the user-interface is being pressed.

Optionally, a light guiding layer 706 is accommodated between the electrically conductive layer 704 and the softer rubber layer 204. The light guiding layer 706 is configured for distributing light from a light source (not shown) onboard the device 100 over an area of the light guiding layer 706. Openings or windows in the harder plastic element 202 will then receive a backlighting, e.g., to indicate a functionality of a particular key in the user-interface of the device 100.

The adjective "slotted" as used in "the second protruding slotted sleeve 303" refers to a slit in the protruding slotted sleeve 303 that engages with a fin at the second pin 509 or at the first rib 509 near the second pin 509 so as to control the orientation of the first keycap 106 in the plane of the upper face of the top part 102. In the case shown, the first keycap 106 is rotationally symmetrical so that the orientation of the first keycap 106 may not be relevant. For other keycaps that are not rotationally symmetrical, e.g., the second keycap 108, a corresponding fin helps to determine the orientation of the other keycap relative to the upper face of the top part 102, thus supporting the use of a piano key arrangement with narrow gaps, as discussed above.

Figure 9:
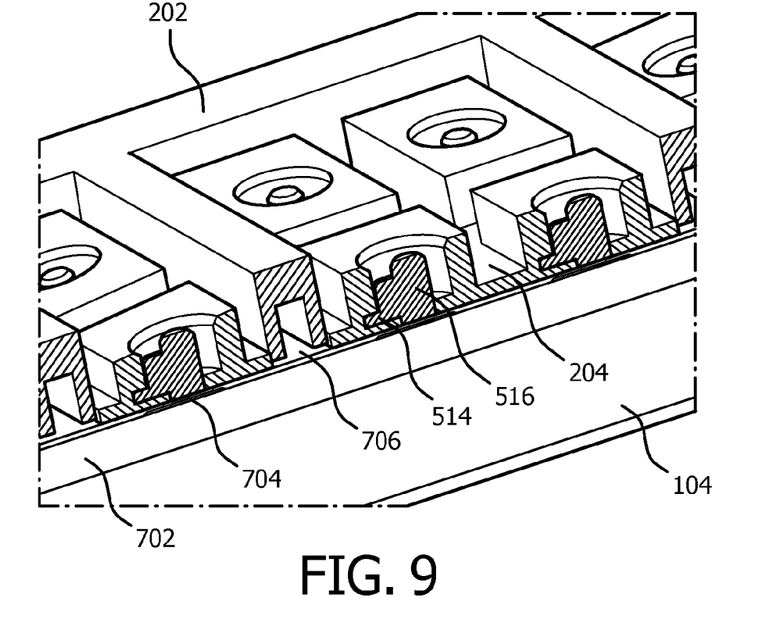
Figure 10:
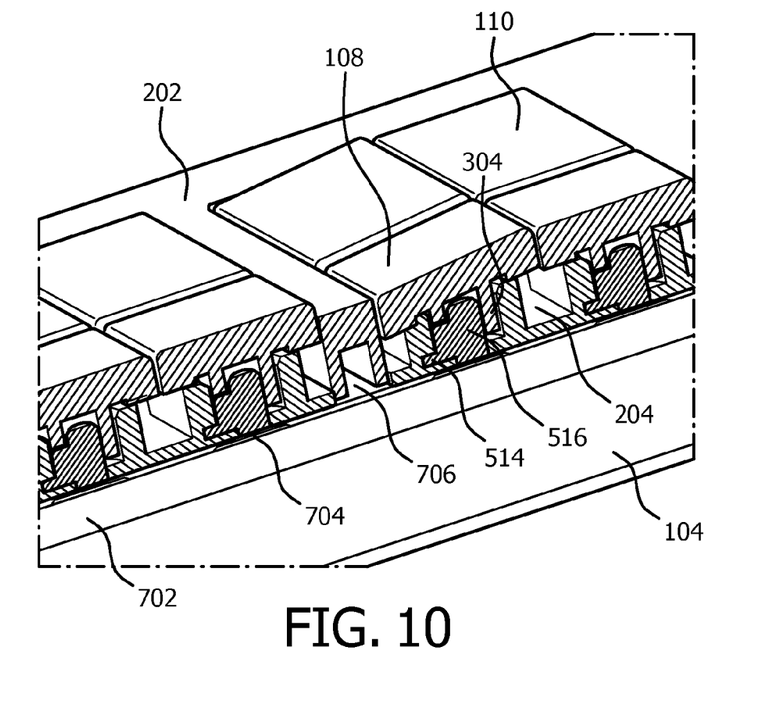

FIGS. 9 and 10 are diagrams showing a lateral cross-section of the device 100 at the other area 510 that is shaped to accommodate the part of the softer rubber layer 204 that is going to receive the second keycap 108, the third keycap 110, etc. Similar considerations apply, mutatis mutandis, as discussed above with reference to the diagrams of FIGS. 7 and 8.

A thin, steel guiding web (not shown) may be used between the keycaps and the softer rubber layer 204 in order to improve positioning and maintaining the orientations of the keycaps.

FIGS. 11, 12, 13 and 14 are diagrams illustrating the assembly of the device 100 from its major components.

Figure 11:
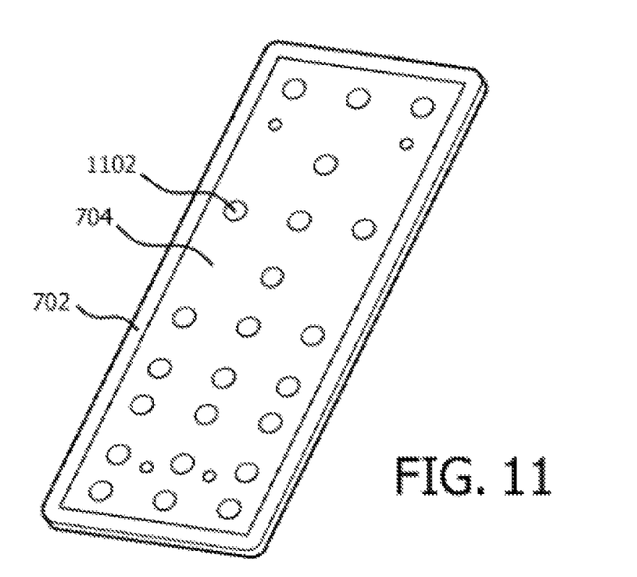
FIGS. 11, 12, 13 and 14 are diagrams illustrating the assembly of the device from its major components.

FIG. 11 is a diagram showing the electrically conductive layer 704 attached, e.g., pasted or connected otherwise, to the PCB 702. The electrically conductive layer 704 comprises multiple domes. In order to not obscure the drawing, a single one of the multiple domes is indicated in the diagram FIG. 11 with a reference numeral 1102.

Figure 12:
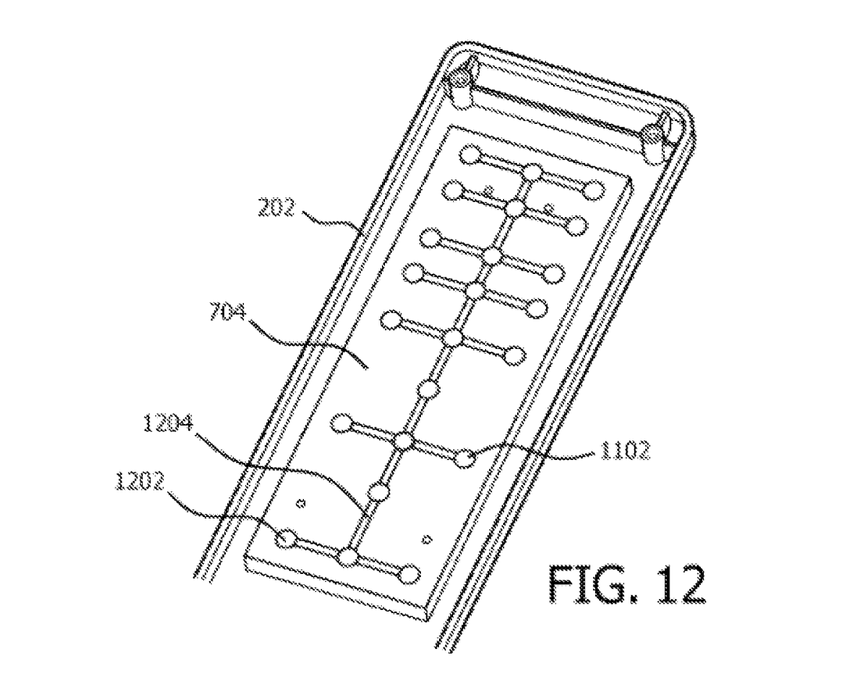

FIG. 12 shows the bottom face of the electrically conductive layer 704 and the location of the dome 1102. As is clear, the electrically conductive layer 704 may be formed by an electrically isolating substrate carrying a pattern of an electrically conductive material of dome tops, e.g., a dome top 1202 interconnected by a patterned electrically conductive trace 1204.

Figure 13:
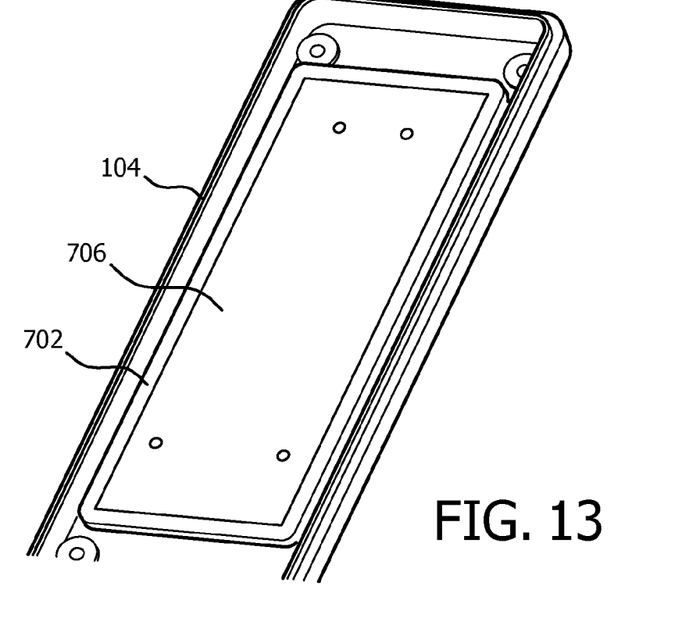

FIG. 13 is a diagram showing the light guiding layer 706 positioned over the electrically conductive layer 704.

Figure 14:
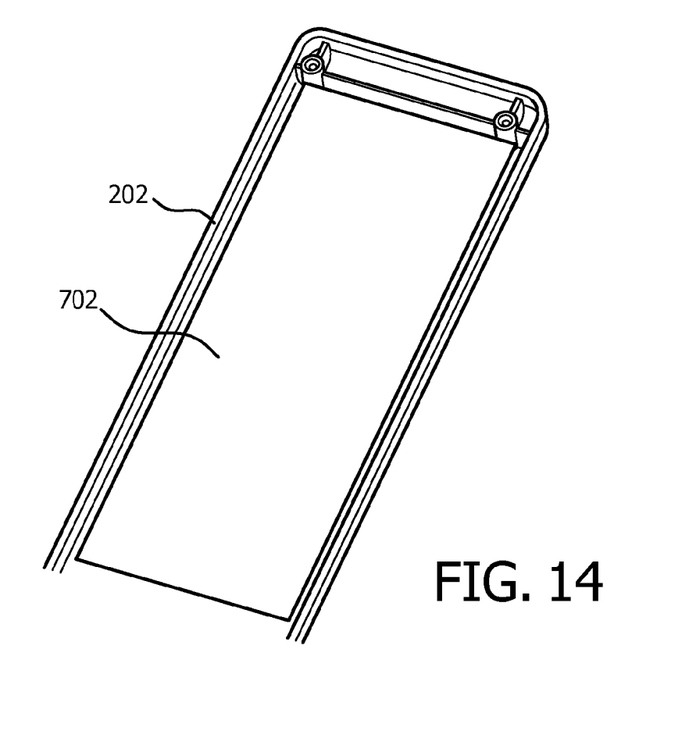

FIG. 14 shows the bottom face of the PCB 702.

For completeness, it is remarked here that the invention is neither restricted to remote control devices, nor to handheld devices. The invention could be applicable to, e.g., mobile telephones, video game controllers, keyboards for text input into a data processing system, controls in the user-interface of a data processing system mounted on a dashboard of a car, etc.

The invention claimed is:

1. A device comprising a user-interface configured for manual interaction of a user with the device, wherein:
   the device has a housing accommodating the user-interface;
   the user-interface comprises one or more keys;
   each specific one of the keys has a specific keycap;
   the housing comprises a top part said top part comprising a harder plastic element and a softer rubber layer;
   the harder plastic element has one or more openings occupied by the softer rubber layer;
   the top part is made in a two-shot injection molding process;
   the softer rubber layer has a specific hole;
   the harder plastic element has a specific pin positioned in the specific hole;
   the specific keycap has a bottom face with a specific protruding sleeve configured for engaging with the specific pin; and
   the bottom face of the specific key and an area at a top face of the softer rubber layer have complimentarily shaped profiles configured for accurately orienting the keycap relative to the top part.

2. The device of claim 1, wherein:
   the harder plastic element has multiple openings;
   a pair of adjacent ones of the openings are separated by a rib that forms a physically integrated part of the harder plastic element; and
   the rib is covered by the softer rubber layer.

* * * * *